Oct. 23, 1928.

O. F. RUSSELL

VALVE

Re. 17,115

Original Filed June 12, 1926

INVENTOR.

O. F. Russell

Reissued Oct. 23, 1928. Re. 17,115

UNITED STATES PATENT OFFICE.

OLIN F. RUSSELL, OF LOS ANGELES, CALIFORNIA.

VALVE.

Original No. 1,611,611, dated December 21, 1926, Serial No. 115,649, filed June 12, 1926. Application for reissue filed April 6, 1927. Serial No. 181,576.

My invention relates to a valve or fitting for use in a pipe line, or the like. The invention provides a fitting which acts as a coupling for pipes, or the like, and operates to close one of the pipes when released to allow separation of the pipes.

It is an object of the invention to provide a simple, economical fitting for use in a pipe line to act in place of an ordinary cut-out cock, or valve.

It is an object of the invention to provide a fitting useful generally in place of the ordinary pipe union.

Another object of the invention is to provide a fitting of the character mentioned in the nature of a union that can be installed in a pipe line without turning either of the pipes to which it is connected.

A further object of the invention is to provide a fitting of the character mentioned which can be readily taken apart for inspection or to replace parts.

Another object of the invention is to provide a union fitting which automatically closes to prevent flow from one pipe upon being released to allow separation of the pipes.

Figure 1:
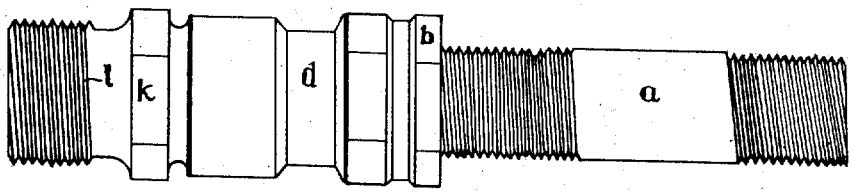
Figure 2:
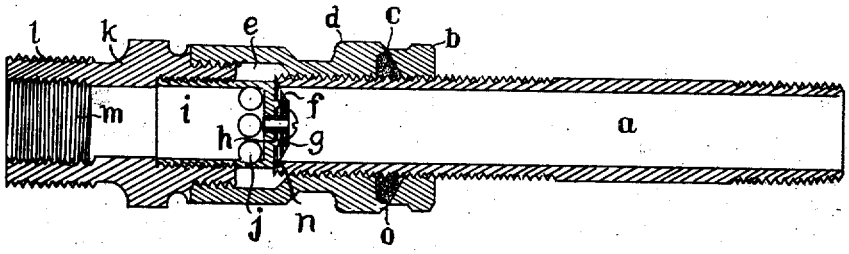

Other objects and advantages of the invention will appear from the following specification in which reference is made to the accompanying drawings, in which:

Fig. 1 is a side elevation showing an external view of the complete valve or fitting, and Fig. 2 is a longitudinal sectional view of the parts shown in Fig. 1.

The fitting provided by my invention, although acting as a valve, is used generally as a union or pipe coupling, is without a stem or operating handle characteristic of valves, and is normally open when in operating position connecting two pipes, or the like. Ordinarily, the fitting is closed only when it is desired to stop the passage of fluid, (water, steam, oil, gas, air, etc.,) through the pipes, as, for instance, when making connections or repairs beyond the fitting.

In the drawings, the reference letters refer to corresponding parts in the two views.

The fitting, as shown in the drawings, includes a nipple *a*, a body member *d*, threaded onto one end of the nipple and having a chamber *e*, a packing or jam nut *b* threaded on the said end of the nipple to co-operate with the end of the member *d* in compressing packing *c*, and a valve *f* carried by the member *d* to co-operate with the inner end of the nipple *a* to close the passage through the fitting.

The nipple *a* is to be connected with a pipe, or the like, and for that purpose it may have its outer end portion screwthreaded. The inner end portion of the nipple is threaded throughout a substantial portion to carry the body member *d* and nut *b* and to allow for the desired operation of the device as hereinafter described.

The body member *d* is screwthreaded onto the inner end portion of the nipple and is recessed or formed with a chamber *e* to pass fluid when the fitting is in the normal working position. The body member is adapted to be connected with a pipe, or the like, and in the case illustrated, it has a threaded end part *k* for making such connection. I show the end part *k* internally threaded at *m* and externally threaded at *l*. Further, I show the end part *k* detachable from the rest of the body member through a screw connection.

The valve *f* is carried by the body member *d* to co-operate with a seat *n* at the inner end of the nipple *a*. I have shown the valve carried by a member *i* of the body so that it faces the inner end of the nipple. The valve *f* is shown with a washer part detachable from the member *i* and provided with detents *g* which receive lugs *h*. The valve *f* may be solid with or formed directly on the member *i* without a washer in which case the joint between the valve and seat may be ground.

In the construction shown, the member *i* has ports *j* connecting with the chamber *e* to pass fluid when the fitting is in operating position.

The packing means is provided between the body and nipple to prevent leakage when the fitting is in operating position. I provide an overhanging lip *o* on the end of the body to meet the outer point of the flange on the jam nut *b* and thereby hold and cover the packing *c*. The jam nut *b* also acts as a jam or lock nut.

The fitting may be installed as a union for connecting two pipes by first backing away the jam nut *b* and turning the body *d* onto the long threaded portion of the nipple as far as it will go. The nipple can then be connected to one pipe and the body, or end part

*k*, to the other pipe by screwing the body outward on the nipple and to its pipe and by screwing the nipple to its pipe. This application of the fitting causes the valve *f* to be away from its seat *n* when the pipes are connected and, therefore, the fitting acts as a pipe union. When the fitting parts are in place, the jam nut can be set to lock the parts and set the packing. When thus in normal operating position, fluid can pass freely between the connected pipes through the fitting. The flow is through the nipple, past the valve *f* through the chamber *e*, through the ports *j* and through the body part *k*.

To close the fitting and thus cut off or stop the flow of fluid, the valve *f* is moved into engagement with the seat *n*. This may be done by screwing the nipple into the body or by screwing the body onto the nipple, as circumstances require.

The fitting can be used to advantage in interior work where neatness and compactness are desirable. This is because the device has no protruding parts such as a valve stem or handle and it reduces danger of dripping so common to cut-out cocks and valves. Another feature of great advantage is the ease with which the fitting can be opened for inspection or repairs. This is accomplished by backing away the jam nut and disconnecting the body parts.

I do not wish to be limited to the details of construction or use herein set forth, but reserve the right to change, modify or vary the construction as may appear to those skilled in the art.

Having described my invention, I claim:

1. A valve comprising a nipple having a long running thread and a valve seat at one end, an end member internally and externally threaded at each end, an internal annular valve member provided with a plurality of ports and carrying a removable washer and a detent provided between the washer and its holder, an intermediate annular member provided with a chamber forming a by-pass around the end of said valve member when open, an annular lip formed on one end of said intermediate member, and a packing nut to co-operate with the lip to enclose a packing.

2. In a device of the class described in combination, a nipple having a seat, a valve member provided with a detent to engage a washer, a packing member provided with an overhanging lip, and a jam nut having a beveled flange, the packing member and nut being mounted on a traveling thread on the nipple.

3. In a device of the class described in combination, a nipple provided with a relatively long threaded portion and provided with a valve seat, and a member having threaded ends and having a ported part with a valve, the member having a portion, the inside diameter of which is larger than said part to form a by-pass around said part.

4. A valve comprising a nipple having a long running thread and a seat at one end, a member threaded at its ends, an internal annular ported part in said member, a valve carried by said part to co-operate with the seat, an external annular part forming a by-pass chamber around the internal part and threaded onto the nipple, and a packing nut on the nipple to co-operate with said external part.

5. A valve comprising a unitary pipe nipple having a long running thread and a seat at one end, a member threaded at its ends, an internal annular ported part in said member, a valve carried by said part to cooperate with the seat, and an external annular part forming a by-pass chamber around the internal part and threaded onto the nipple.

6. A pipe fitting of the character described, including two relatively movable parts, one a nipple having a long threaded portion, the other a body threaded on said portion of the nipple, a portion in one part having detents, a washer carried by said portion at the detents and a seat on the other part to cooperate with the washer.

In witness that I claim the foregoing I have hereunto subscribed my name this 27th day of June, 1927.

OLIN F. RUSSELL.